United States Patent
Pickers

(10) Patent No.: US 9,723,404 B2
(45) Date of Patent: Aug. 1, 2017

(54) DIGITAL LOW PASS FILTER

(71) Applicant: Red Lion 49 Limited, Kidlington Oxford, Oxfordshire (GB)

(72) Inventor: Charles Henry Pickers, Kidlington (GB)

(73) Assignee: Red Lion 49 Limited, Begbroke, Kidlington Oxford (GB)

( * ) Notice: Subject to any disclaimer, the term of this patent is extended or adjusted under 35 U.S.C. 154(b) by 0 days.

(21) Appl. No.: 15/246,331

(22) Filed: Aug. 24, 2016

(65) Prior Publication Data

US 2017/0064446 A1  Mar. 2, 2017

(30) Foreign Application Priority Data

Aug. 28, 2015 (GB) .................................. 1515328.1

(51) Int. Cl.
*H04R 3/04* (2006.01)
*G06F 5/01* (2006.01)

(52) U.S. Cl.
CPC .................. *H04R 3/04* (2013.01); *G06F 5/01* (2013.01); *G06F 2205/00* (2013.01)

(58) Field of Classification Search
CPC .......... H04R 3/04; G06F 5/01; G06F 2205/00
USPC ........................................... 381/98, 104, 119
See application file for complete search history.

(56) References Cited

U.S. PATENT DOCUMENTS

| | | | |
|---|---|---|---|
| 3,912,917 A | | 10/1975 | Nussbaumer |
| 5,270,954 A | * | 12/1993 | Sakata ............... H03H 17/0294 708/322 |
| 5,892,833 A | * | 4/1999 | Maag ...................... H04R 3/04 381/103 |
| 5,910,904 A | * | 6/1999 | Uramoto ............... H03H 17/04 381/98 |
| 6,141,672 A | | 10/2000 | Driendl et al. |
| 2005/0008071 A1 | | 1/2005 | Bose et al. |

\* cited by examiner

*Primary Examiner* — David Ton
(74) *Attorney, Agent, or Firm* — Richard M. Goldberg

(57) ABSTRACT

A digital low pass filter for producing an output value given a target value includes a memory which stores a scaling factor, a previous output value, a previous intermediate value, and the target value; the difference between the target value and the previous output value is evaluated, and then multiplied by the scaling factor to produce an intermediate value; the previous intermediate value is multiplied by the scaling factor minus unity; the output value is evaluated by summing the previous output value, twice the intermediate value, and the previous intermediate value multiplied by the scaling factor minus unity; the output value is then stored in memory as the previous output value, and the intermediate value as the previous intermediate value, such that the filter provides a second-order response but requires fewer hardware multipliers than the direct form implementation of a second-order filter.

18 Claims, 8 Drawing Sheets

DIGITAL LOW PASS FILTER

CROSS REFERENCE TO RELATED APPLICATIONS

This application claims priority from United Kingdom Patent Application No 15 15 328.1 filed on Aug. 28, 2015, the whole contents of which are incorporated herein by reference in their entirety.

BACKGROUND OF THE INVENTION

1. Field of the Invention

The present invention relates to a digital low pass filter for producing an output value given a target value.

2. Description of the Related Art

Digital filters are operative to perform filtering of sampled discrete-time signals, and may broadly be characterised as either recursive or non-recursive. Recursive filters (also known as infinite impulse response filters) tend to be more efficient than non-recursive filters (which are also known as finite impulse response filters) due, in general, to their requirement for fewer multiplication and addition operations. This results in them often being used in applications where processing resources are at a premium.

Such an application is the low pass filtering (or interpolation) of gain coefficients that are to be applied to digital audio signals. If the value of a gain coefficient is changed suddenly, then artefacts are created. This is because the change in gain can be considered as the modulation of the audio signal by a gain waveform. If the gain waveform is a square wave of a high level, then the modulation produces audible sidebands, resulting in unwanted distortion. There is therefore a requirement to control the rate of change in the gain to be applied to an audio signal.

Audio mixing consoles, used in music production and broadcasting for example, are often used to control the gain of hundreds of channels of audio via faders. Increasingly, mixing consoles are moving to all-digital platforms, with gain being set not only by physical faders but by virtual faders as well. Given the high channel count of such consoles, there is a requirement for an efficient implementation of a digital low pass filter to be able to compute, given a target gain value, an actual gain value to apply to one of many audio channels within an audio sample period. At a 96 kilohertz sampling rate, the audio sample period is around 10.4 microseconds. Thus, the gain coefficient for every channel must be calculated within this window.

First order IIR filters may be implemented naïvely using three multipliers, two adders and two delay units. However, their response is not particularly fast, meaning that when used for controlling the gain of an audio signal, they can lack the sense of attack of second order filters. However, a direct implementation of a second order filter requires four multipliers, three adders and four delay units. Whilst second order filters can be constructed using cascaded first order filters, a delay is imposed because the output of the first filter must be calculated before it can be supplied to the input of the second filter.

It is therefore an object of the present invention to provide a true second order filter that is more efficient in terms of resource usage than existing designs, but can still be optimised to give a high throughput.

BRIEF SUMMARY OF THE INVENTION

The invention is directed towards a digital low pass filter that produces an output value given a target value. A scaling factor, a previous output value, a previous intermediate value, and the target value are stored in memory. The difference between the target value and the previous output value is evaluated, and then multiplied by the scaling factor to produce an intermediate value. The previous intermediate value is multiplied by the scaling factor minus unity. The output value is evaluated by summing the previous output value, twice the intermediate value, and the previous intermediate value multiplied by the scaling factor minus unity. The output value is then stored in memory as the previous output value, and the intermediate value as the previous intermediate value.

The filter provides a second order response but requires fewer hardware multipliers than the direct form implementation of a second-order filter.

DETAILED DESCRIPTION OF THE INVENTION

The following embodiments are described in the context of providing low pass filtering (or interpolation) of gain coefficients to be applied to audio signals in a mixing console. However, it will be appreciated by those skilled in the art that the present invention may be deployed in other applications, such as upsampling of digital signals or interpolating between look-up table values.

FIG. 1

Figure 1:
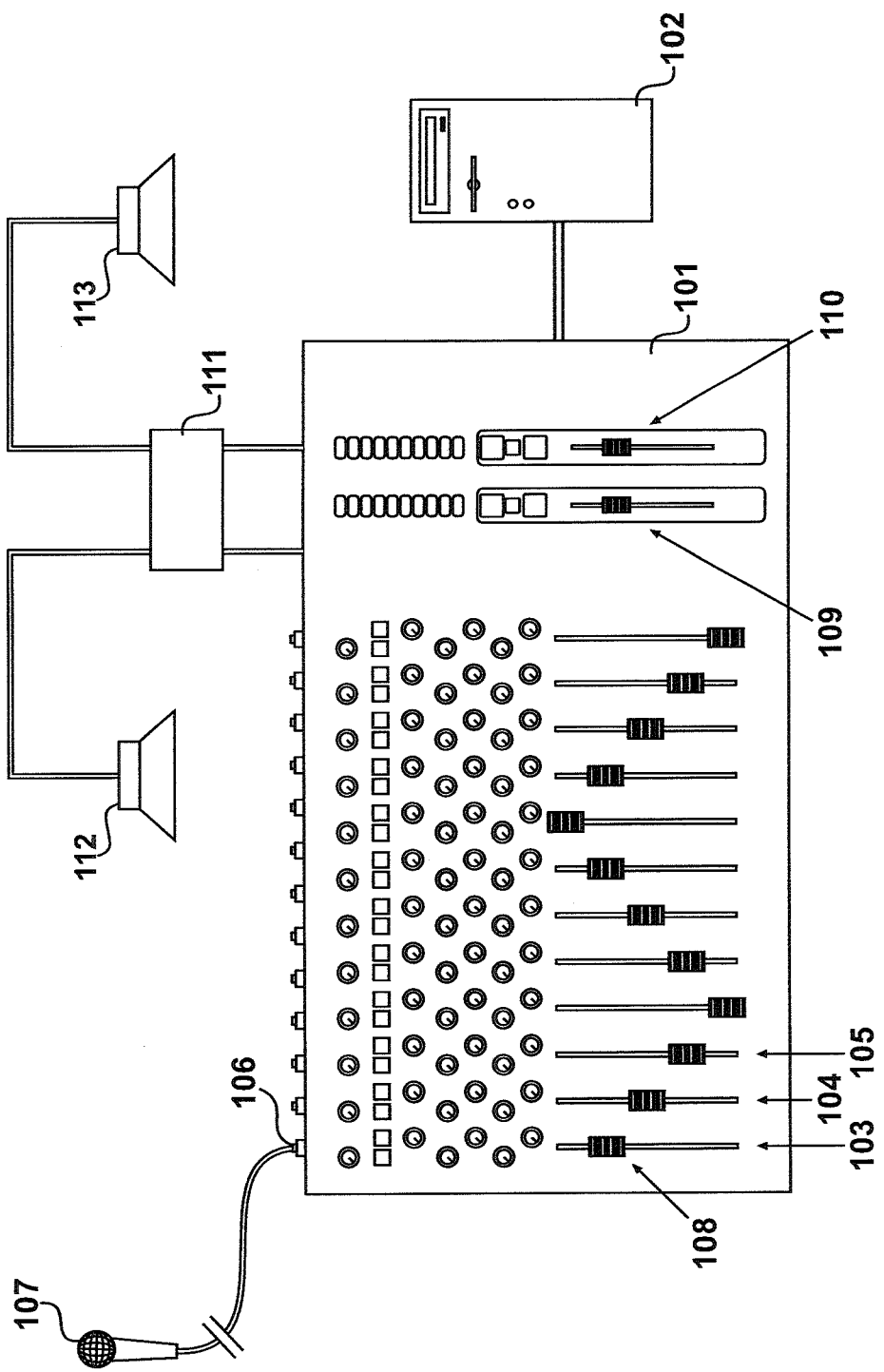
FIG. 1 shows an exemplary audio mixing configuration where the present invention may be deployed.

An exemplary audio mixing configuration is illustrated in FIG. 1, in which a mixing console 101 is being used to mix numerous channels of audio into one output for recording to a hard disk recording system 102.

The mixing console 101 comprises a number of channel strips such as channel strips 103, 104 and 105. Each of these channel strips, for instance channel strip 103, corresponds to one particular input, such as input 106 which receives an input signal from a microphone 107.

Faders, such as fader 108, are also present to control the relative contribution of the channel to the final mix by adjusting the gain of the particular channel's input audio signal. In this example, master faders 109 and 110 are also present which control the contribution of each of two stereo channels to the final mix. In the example shown in FIG. 1, a power amplifier 111 is provided to allow the mix to be monitored by an operator by means of two loudspeakers, 112 and 113. A recording of the final output mix is made by hard disk recording system 102.

FIG. 2

Figure 2:
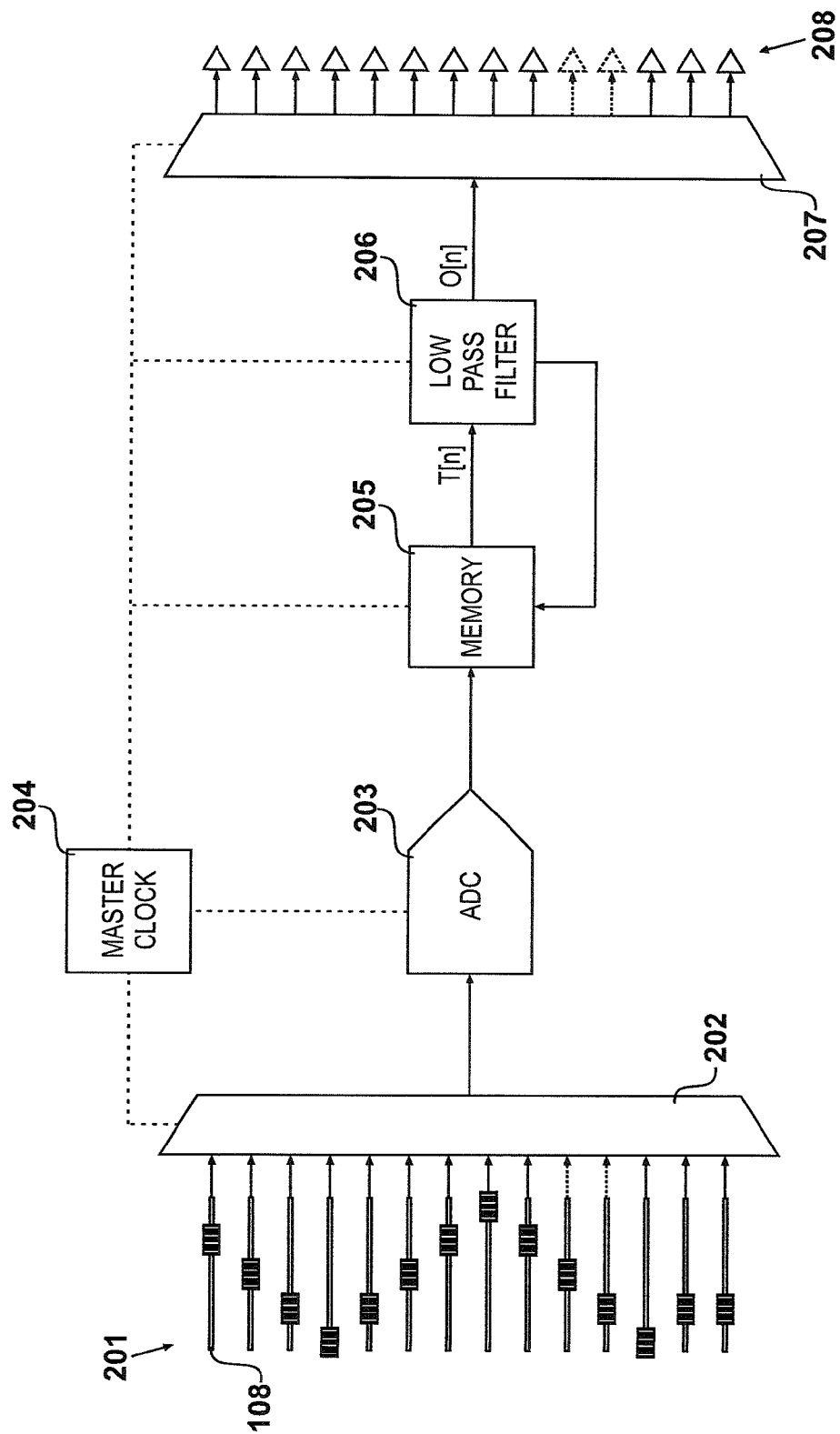
FIG. 2 shows a block diagram of sub-systems within the mixing console 101 identified in FIG. 1.

In the mixing console shown in FIG. 1, the gain applied to audio signals within the mixing console is digitally controlled, with 16 bit integers typically being used to represent the gain level for a channel. The gain coefficient for a particular channel's signal is determined by a sampled position of the channel's fader. A block diagram of sub-systems within the mixing console to provide interpolation of the sampled position of the console's faders (i.e. the target gain level for each channel) is shown in FIG. 2.

Each one of the group of faders 201 on the mixing console, including fader 108 previously described with reference to FIG. 1, is connected via a multiplexer 202 to a 16 bit analogue to digital converter (ADC) 203. Both the multiplexer 202 and the ADC 203 are in this example connected to a master clock circuit 204, which in this example operates at 250 megahertz with appropriate frequency division taking place within the connected components to achieve correct switching and sampling rates. The multiplexer 202 is configured to switch between its inputs at a rate equivalent to the number of channels under control, which in this example is 14, multiplied by the audio sample rate, which in this example is 96 kilohertz, i.e. 1.344 megasamples per second. It will be appreciated that in many applications of the present invention, the number of faders will be much higher, with some consoles available from the present applicant including around sixty faders. In this application, an assumption that the rate of change in fader position is not likely to change sample-to-sample at a rate of 96 kilosamples per second could be made, and so the multiplexer can be arranged to switch between each fader at that rate, relaxing the requirements of the ADC 203 so that it only needs to sample at the audio sample rate.

Each fader in the present example is a linear potentiometer, such that the ADC 203 is configured to sample the voltage across potentiometer to give an indication of its current position. Alternative configurations may be used, with linear encoders being a possibility.

In any event, the sampled voltage level from each fader is written to a respective location main memory 205 as a current target value, $T_M[n]$ where M is the channel number, so in this case $0 \leq M \leq 13$. Data held in main memory 205 will be described in greater detail with reference to FIG. 4.

Referring again to FIG. 2, the data from main memory 205, including a current target value $T_M[n]$ for a channel M, is read by a low pass filter 206 which filters the target value $T_M[n]$ to produce an output value $O_M[n]$. The characteristics of low pass filter 206 will be described further with reference to FIG. 3. Low pass filter 206 is a digital filter and is recursive, and therefore writes data back to main memory 205 for use in the filtering of a new target value for a particular channel.

The output values $O_0[n] \ldots O_M[n]$ are outputted one at a time to a demultiplexer 207 which switches at the rate at which the output values are produced. The output side of the demultiplexer 207 is connected to the amplifiers 208 for the audio channels, which receive their respective output value and adjust their gain accordingly. It should be appreciated that the term "amplifier" as used herein refers to both physical amplifiers, in this case responsive to a digital input, and also to signal processing elements, e.g. multipliers, which scale the magnitude of a digital signal within the mixing console.

FIG. 3

Figure 3:
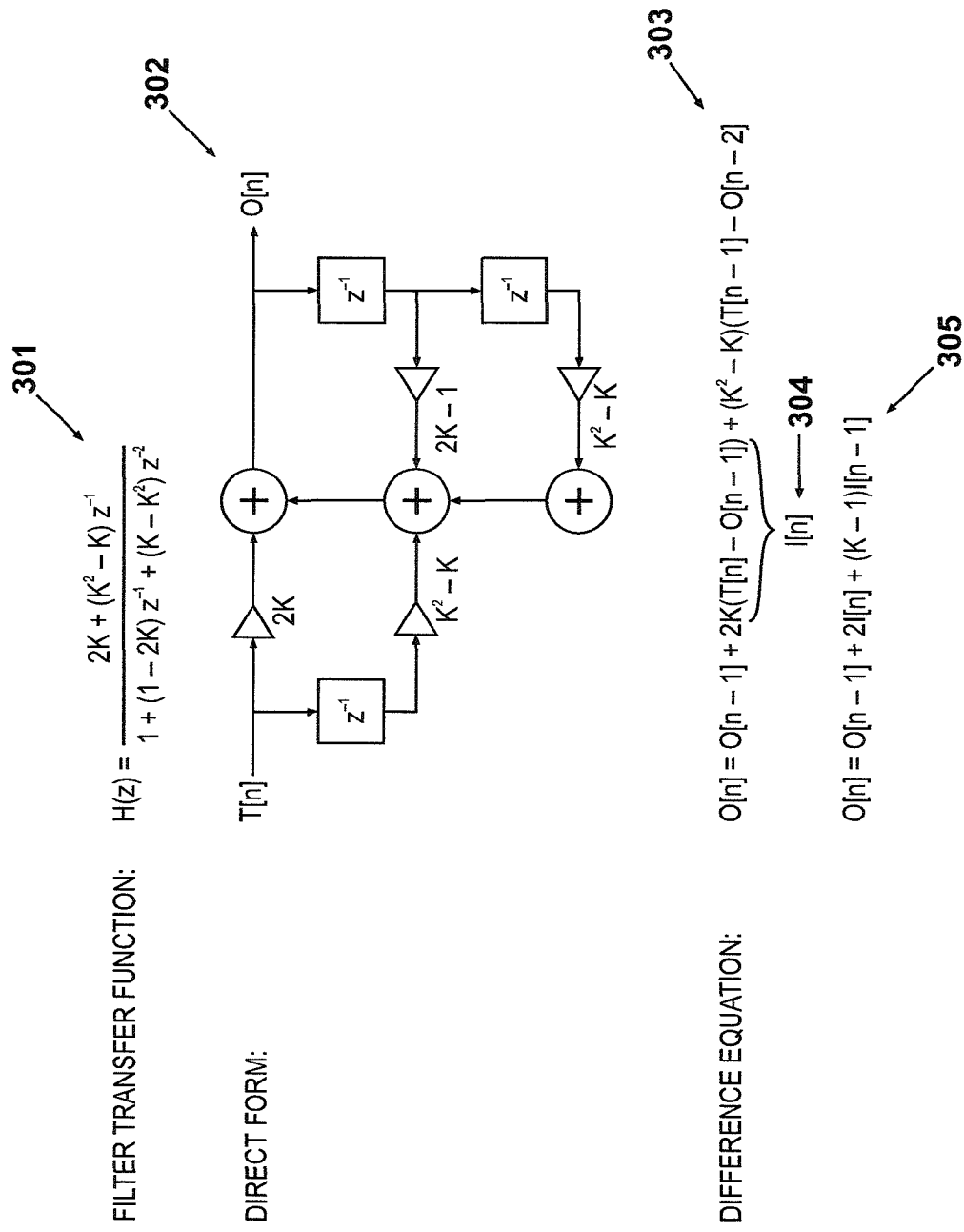
FIG. 3 shows the low pass filter 206 of the present invention in various representations.

The low pass filter 206 of the present invention is illustrated in various representations in FIG. 3.

The filter's transfer function 301 is as follows:

$$H(z) = \frac{2K + (K^2 - K)z^{-1}}{1 + (1 - 2K)z^{-1} + (K - K^2)z^{-2}} \quad \text{[Equation 1]}$$

Thus, in the z domain, the filter's transfer function H(z) is: the sum of twice a scaling factor, K, and the inverse of z multiplied by the square of K minus K; divided by: unity, plus the inverse of z multiplied by unity minus twice K, plus the inverse of the square of z multiplied by K minus the square of K. It can therefore be seen that the low pass filter 206 is a second order filter, albeit with the coefficient of $z^{-2}$ in the dividend being set to zero. As will be familiar to those skilled in the art, the scaling factor K of the filter determines the filter's gain and thus its corner frequency.

A direct form of this second order filter is shown generally at 302, requiring three delay lines, four multipliers and three adders, representing a naïve approach to realising the low pass filter 206.

The difference equation for the low pass filter 206 is shown generally at 303 for completeness. On inspection, it is clear that there is a degree of similarity between the term $$2K(T[n]-O[n-1]) \quad \text{[Equation 2]}$$

and the term $$(K^2-K)(T[n-1]-O[n-2]) \quad \text{[Equation 3]}$$

which enables the substitution $$I[n]=K(T[n]-O[n-1]) \quad \text{[Equation 4]}$$

where I[n] is termed an intermediate value 304.

This gives a modified difference equation 305 of $$O[n]=O[n-1]+2I[n]+(K-1)I[n-1] \quad \text{[Equation 5]}$$

where it will be appreciated that $$I[n-1]=K(T[n-1]-O[n-2]) \quad \text{[Equation 6]}$$

By making this substitution, it is possible to realise the low pass filter 206 in a more efficient manner than the direct form 302. This is because the values of 2I[n] and (K−1)I[n−1] can be evaluated in parallel with further optimisations being made to improve pipelining of other values, as will be described further with reference to FIGS. 6 and 7.

FIG. 4

As described previously with reference to FIG. 2, the mixing console 101 includes a large number of channels having target gain coefficients $T_0[n] \ldots T_M[n]$ that require filtering by low pass filter 206 to give output gain coefficients $O_0[n] \ldots O_M[n]$ for supplying to the respective amplifiers. In the present embodiment, each output O[n] is calculated within one audio sample period with reference to a previous output O[n−1], a target value T[n], a scaling factor K, and a previous intermediate value I[n−1].

Figure 4:
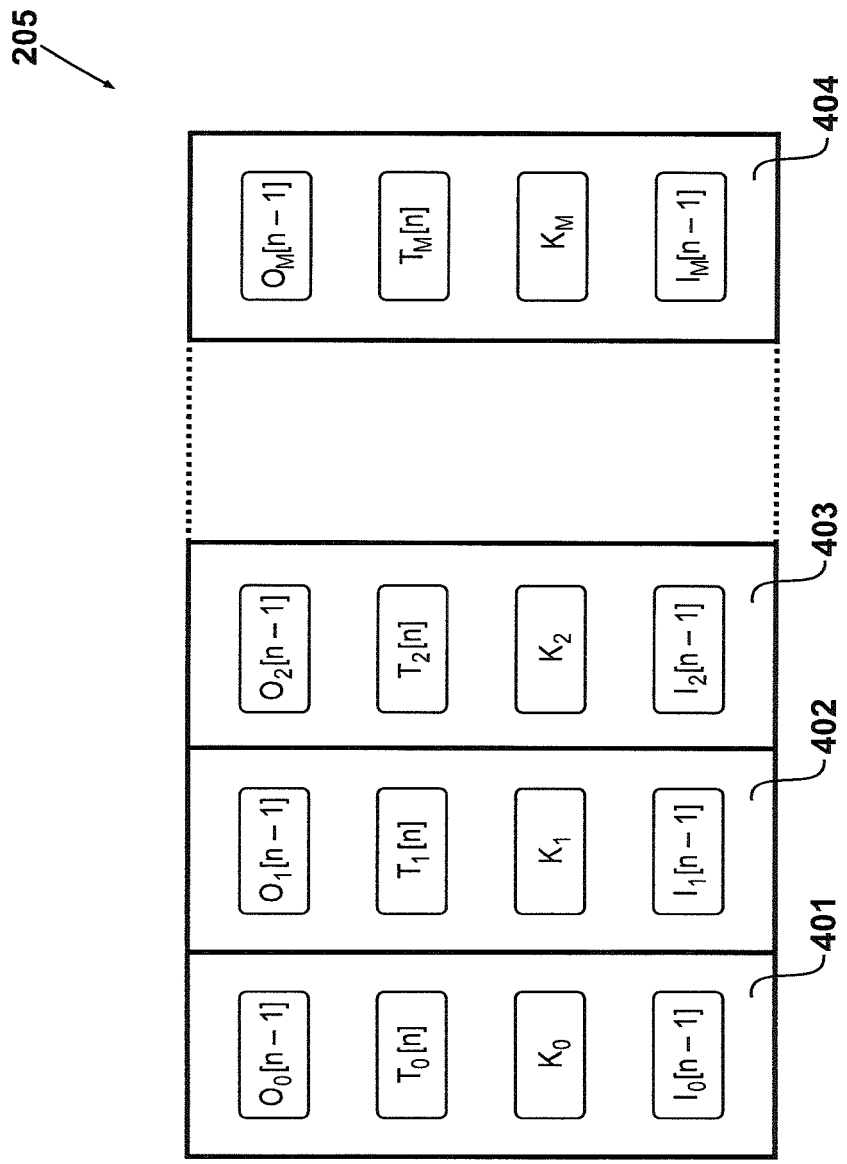
FIG. 4 shows a mapping of filter coefficients in main memory 205.

A mapping of these coefficients in main memory 205 is shown in FIG. 4, with the coefficients $O_0[n-1]$, $T_0[n]$, $K_0$, and $I_0[n-1]$ for a first channel shown in memory partition 401, the coefficients $O_1[n-1]$, $T_1[n]$, $K_1$, and $I_1[n-1]$ for a second channel shown in memory partition 402, the coefficients $O_2[n-1]$, $T_2[n]$, $K_2$, and $I_2[n-1]$ for a third channel shown in memory partition 403, and the coefficients $O_M[n-1]$, $T_M[n]$, $K_M$, and $I_M[n-1]$ for an Mth channel shown in memory partition 404.

In this embodiment, the scaling factor K used by the low pass filter 206 is specific to each channel, and therefore allows the filter's response to be tailored in dependence upon the input signal for each channel. In a specific embodiment, the scaling factor K is different when T[n] is greater than T[n−1] to when T[n] is less than T[n−1]. This will give a different response in terms of the change in gain for a channel depending on whether the corresponding fader movement is requesting an increase or decrease in gain.

More sophisticated control of the scaling factor K involves it being proportional to the difference between T[n] and T[n−1], i.e. for fast motion of a fader, the response of the filter is different to slow motion. Thus a particular K may vary for a particular channel on a sample-to-sample basis to allow tailoring of the characteristics of the fader.

In the present embodiment, the scaling factor takes a value of greater than zero and less than or equal to 0.1, i.e. $0<K\leq0.1$ as this gives a faster initial response to a step input and a slower response to small changes than a first order filter for equivalent values of K.

Figure 8:
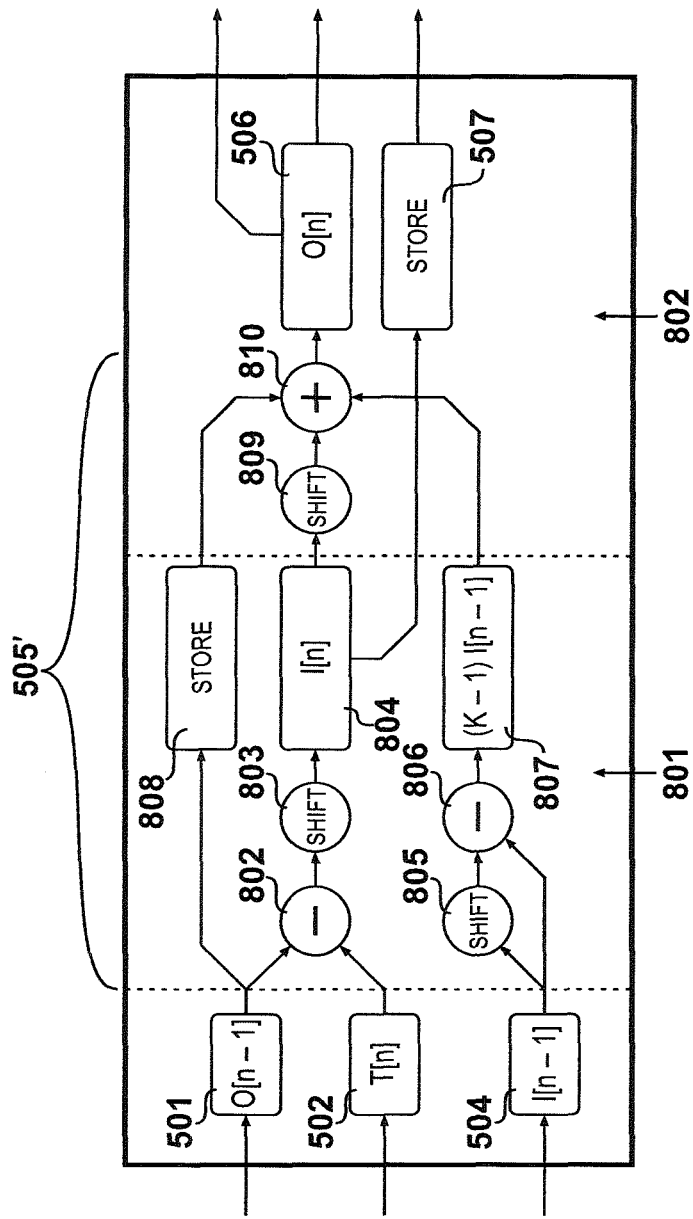
FIG. 8 is an illustration of the low pass filter 206 comprising an optimised processing core 505' suitable for certain values of the scaling factor K.

As will be described further with reference to FIG. 8, there are special values of K where considerable optimisation of the hardware implementation of the low pass filter 206 can be made, and occur when K is equal to the inverse of an integer power of two, i.e. $K=2^{-N}$ where N is an integer.

FIG. 5

Figure 5:
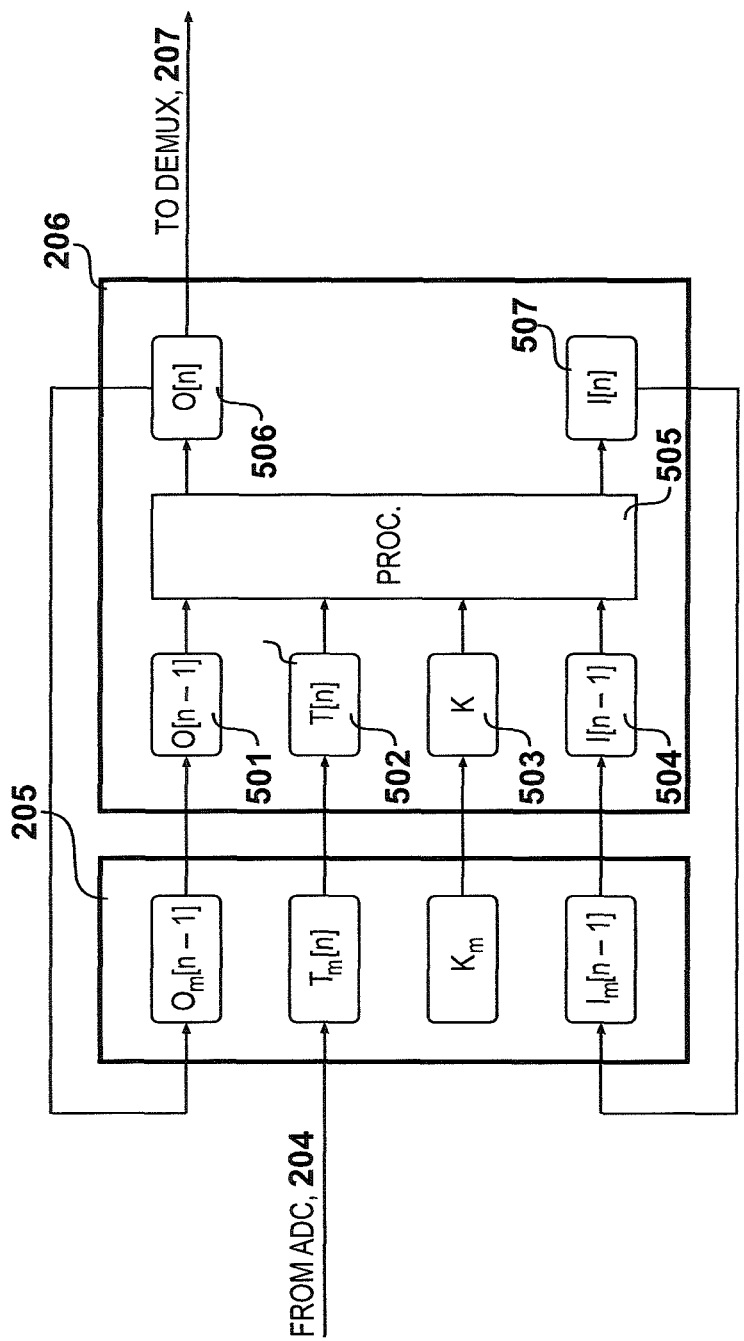
FIG. 5 illustrates the flow of coefficients between main memory 205 and low pass filter 206.

A diagram illustrating the flow of coefficients between main memory 205 and low pass filter 206 is shown in FIG. 5.

A target value $T_M[n]$ for a channel M is written to main memory 205 at the appropriate memory location. It is accompanied as previously described by the previous output value $O_M[n-1]$ for the channel, the scaling factor $K_M$ for the channel, and the previous intermediate value $I_M[n-1]$ for the channel. For processing by the low pass filter 206, these values are written to corresponding input registers in the low pass filter. The low pass filter 206 therefore includes a first input register 501 for storage of a previous output value, a second input register 502 for storage of the target value, a third input register 503 for storage of the scaling factor to be used when filtering, and a fourth input register 504 for storage of the previous intermediate value.

The values in input registers 501 to 504 are then passed to a processing core 505 which generates and writes an output value to a first output register 506 and an intermediate value to a second output register 507. Embodiments of the processing core 505 will be described further with reference to FIGS. 6 and 8.

The output value in register 506 is supplied to the demultiplexer 207 for provision to the corresponding amplifier for channel M. The output value is also written back to main memory 205 as the previous output value $O_M[n-1]$ for the channel, whilst the intermediate value in register 507 is written back to main memory 205 as the previous output value $I_M[n-1]$ for the channel.

In the present embodiment, the scaling factors K are 8 bit integers with the target values T[n] being 16 bit integers. The output value O[n] from the low pass filter 206 is generated as a 24 bit integer, in which the 8 least significant bits are fractional bits and are dropped for provision to the amplifiers. However, 24 bit precision is maintained within the filter by writing the output value and intermediate value back to main memory with their fractional bits intact.

It will be appreciated that the example of 8, 16, and 24 bit integers is purely a matter of implementation: the precision could differ between the scaling factor and the target value for example, and larger or smaller bit widths could be used depending upon the application.

FIG. 6

Figure 6:
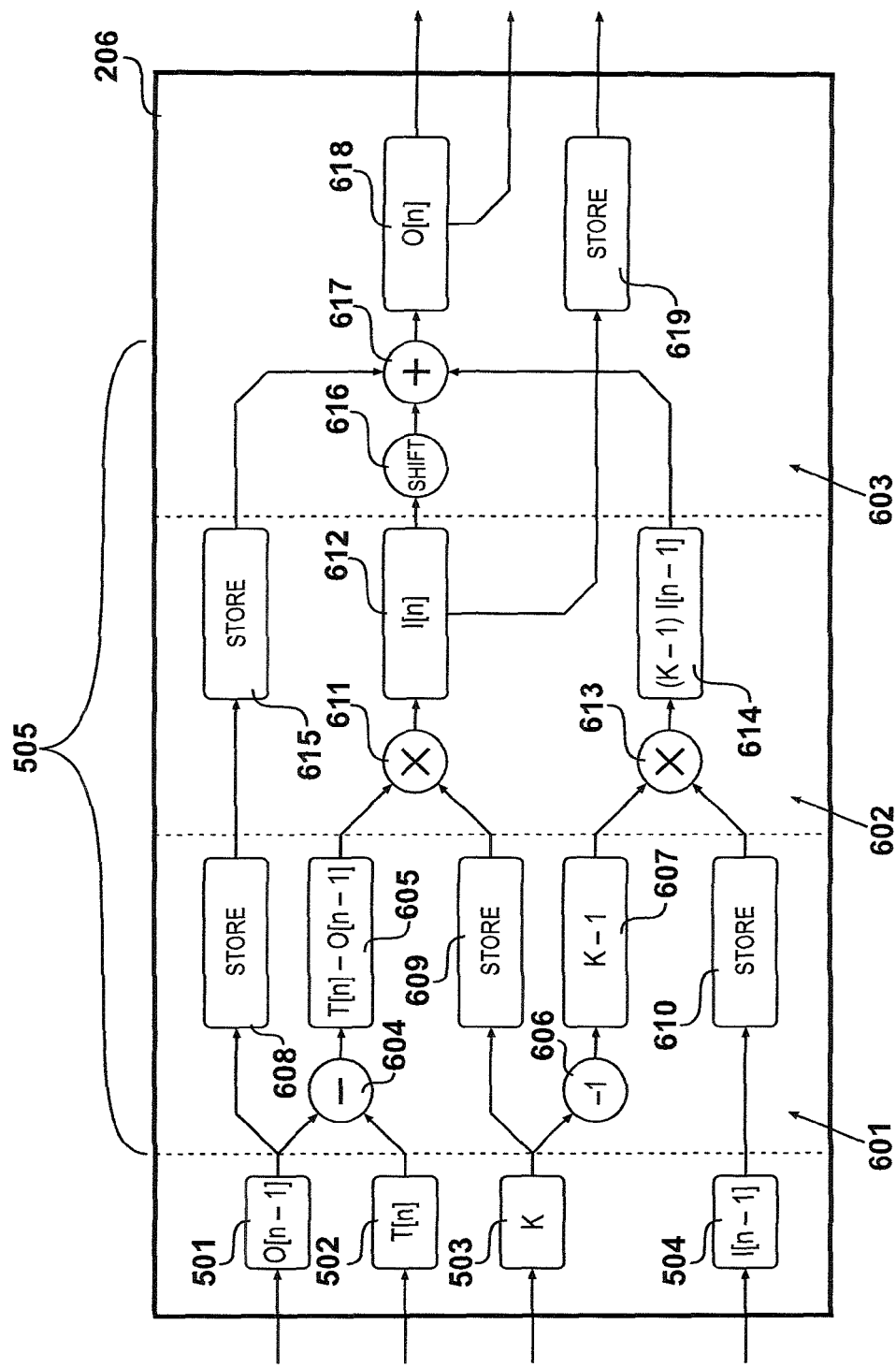
FIG. 6 is an illustration of the low pass filter 206 comprising a processing core 505 suitable for any value of the scaling factor K.

An illustration of the low pass filter 206 comprising a first embodiment of the processing core 505 suitable for any value of the scaling factor K is illustrated in FIG. 6.

The input coefficients for the low pass filter 206 are initially stored in their respective registers: O[n−1] in the first input register 501, T[n] in the second input register 502, K in the third input register 503, and I[n−1] in the fourth input register 504.

The low pass filter 206 is divided into three pipeline phases: first phase 601, second phase 602 and third phase 603.

In the first phase 601, the previous output value O[n−1] is supplied to the negating input of a subtracter 604, and the target value T[n] to the non-negating input. The output of the subtracter 604 is T[n]−O[n−1], which is written to a register 605. In parallel, the scaling factor K is supplied to a subtracter 606 where unity is subtracted from it. The output of subtracter 606, K−1, is written to a register 607.

Also in parallel, the previous output value O[n−1], the scaling factor K, and the previous intermediate value I[n−1] are also stored in respective pipeline registers 608, 609 and 610.

In the second phase 602, the contents of register 605 are supplied along with the contents of register 609 to the inputs of a first multiplier 611 whose output, I[n], is written to a register 612. In parallel, the contents of register 607 and the contents of register 610 are supplied to a second multiplier 613 whose output, (K−1)I[n−1], is written to a register 614. Also in parallel the previous output value O[n−1] is passed from pipeline register 608 to a further pipeline register 615.

In the third phase 603, the value of I[n] in register 612 is subjected to a bit shift operation by shifter 616 to achieve a multiply-by-two, such that a value 2I[n] is supplied to one input of a three input adder 617. Adder 617 also receives the value of (K−1)I[n−1] stored in register 614 and the value of O[n−1] stored in register 615. The output of adder 617, O[n], is stored in output register 618. In parallel, the contents of register 612 are written to a pipeline register 619. The contents of registers 618 and 619 including their fractional bits are written back to main memory as previously described with reference to FIG. 5, with the contents of register 618 (without fractional bits) also being supplied to its corresponding amplifier via demultiplexer 207.

It can be seen that the arrangement of the low pass filter 206 shown in FIG. 6 requires only three addition circuits and two multiplier circuits, due to the pipelining achieved by the relation of the filter coefficients to each other. In this way, the illustrated low pass filter lends itself to implementation in devices where hardware adders and multipliers are at a premium, such as in application specific integrated circuits (ASICs) or field programmable gate arrays (FPGAs). For implementation in an FPGA, such as a Spartan-6 available from Xilinx, Inc. of San Jose, Calif. USA, the low pass filter 206 of the present invention could be made available as a hardware description implementable by an FPGA, in a language such as VHDL or Verilog which will be familiar to those skilled in the art. When compiled and loaded into the FPGA, the hardware description would then cause the FPGA to configure itself as the low pass filter of the present invention.

The pipelining also gives the advantage of being able to filter gain coefficients for more channels within an audio sample period, reducing the requirement for multiple filters in parallel.

FIG. 7

Figure 7:
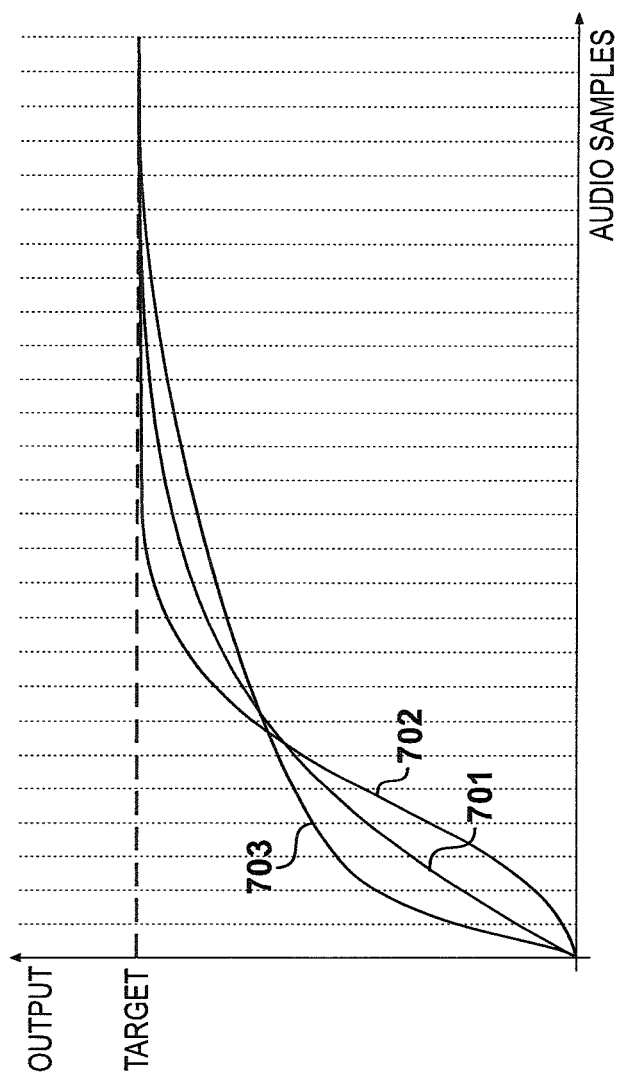
FIG. 7 is a plot of the response of the low pass filter 206 with the processing core 505.

A plot of the response of the low pass filter 206 with the processing core 505 is shown in FIG. 7.

The plot graphs the output value given a target value, versus audio sample number, and is solely for the purposes of comparison of response between the low pass filter of the present invention, and conventional first-and second-order low pass filters.

Following a step input, it can be seen that the first order response 701 of a conventional first-order filter rises gradually. It can also be seen that the second order response 702 of a conventional second-order filter rises more gradually, but the rate of change increases and so it reaches the target value more quickly than the first order response 701.

The response of the low pass filter 206 of the present embodiment is shown at 703 with K set to a value between 0 and 0.1. It may be noted that the initial response is faster than either the first- or second-order responses, making it particularly suitable for filtering of gain coefficients in mixing consoles where a degree of attack is appreciated, but a true second-order response is still desired.

FIG. 8

As described previously, certain values of the scaling factor K allow optimisation of the hardware used to realise the low pass filter 206. Such an optimised realisation is illustrated in FIG. 8, in which the low pass filter 206 comprises a processing core 505' optimised for $K=2^{-N}$ where N is an integer.

In this embodiment, no multipliers are required as each multiply operation may be achieved by a bit shift operation. Filtering in this embodiment is split into two pipelining phases: a first phase 801 and a second phase 802.

In the first phase, the previous output value O[n−1] stored in input register 501 is supplied along with the target value T[n] stored in input register 502 to the input of a subtracter 802. The output of subtracter 802 is immediately bit shifted by a shifter 803 to give the value I[n] which is written to a register 804. The shifter 803 implements N bit shifts of T[n]−O[n−1] to achieve multiplication by $2^{-N}$, i.e. by K.

In parallel, the previous intermediate value I[n−1] stored in input register 504 is initially subjected to a bit shift operation by shifter 805, which is identical in operation to shifter 803. The output of shifter 803 is provided to the non-negating input of a subtracter 806, whilst an unmodified value of I[n−1] is provided to its negating input to achieve subtraction of I[n−1] from KI[n−1]. The resulting output from subtracter 806, (K−1)I[n−1], is then stored in a register 807. Also in parallel, the value of O[n−1] is stored in a pipeline register 808.

During the second phase, the value of I[n] is subjected to a bit shift operation by shifter 809 to achieve a multiply-by-two. The value 2I[n] is thus provided to an input of adder 810, along with the value of (K−1)I[n−1] in register 807 and the value of O[n−1] in register 808. The output of adder 810, O[n], is written to output register 506. In parallel, the value of I[n] stored in register 804 is written to pipeline register 507.

As with processing core 505 described with reference to FIG. 6, the output value in register 506 is supplied to the demultiplexer 207 for provision to the corresponding amplifier for channel M. The output value is also written back to main memory 205 as the previous output value $O_M[n-1]$ for the channel, whilst the intermediate value in register 507 is written back to main memory 205 as the previous output value $I_M[n-1]$ for the channel.

Processing core 505' therefore does not require use of any hardware multipliers to facilitate implementation in resource-scarce environments.

What is claimed is:

1. A digital low pass filter for producing an output value given a target value in audio processing, comprising:
   a memory that stores a scaling factor, a previous output value, a previous intermediate value, and the target value;
   a first subtracter configured to evaluate a difference between the target value and the previous output value and to produce a first output;
   a second subtracter configured to subtract unity from the scaling factor and to produce a second output;
   a first multiplier configured to multiply the first output by the scaling factor to produce an intermediate value as a third output;
   a second multiplier configured to multiply the second output by the previous intermediate value to produce a fourth output; and
   an adder configured to sum twice the third output, the fourth output, and the previous output value stored in said memory to produce the output value;
   wherein the output value is written to said memory as a new previous output value, and the intermediate value is written to said memory as a new previous intermediate value.

2. The digital low pass filter of claim 1, in which the scaling factor is a number greater than zero and less than or equal to 0.1.

3. The digital low pass filter of claim in which the scaling factor is variable so as to alter a filter response of the digital low pass filter.

4. The digital low pass filter of claim 1, in which subtractions carried out by the first subtracter and the second subtracter are carried out in parallel, and multiplications carried out by the first multiplier and the second multiplier are carried out in parallel.

5. The digital low pass filter of claim 4, further comprising:
   a first pipeline register to store the scaling factor, a second pipeline register to store the previous output value, and a third pipeline register to store the previous intermediate value whilst the subtractions are carried out;
   a fourth pipeline register to store the previous output value whilst the multiplication operations are carried out; and
   a fifth pipeline register to store the intermediate value whilst the addition operation is carried out by the adder.

6. The digital low pass filter of claim 1, in which the output value and the intermediate value are written to memory with fractional bits to maintain precision.

7. The digital low pass filter of claim 1, implemented using one of:
   a field programmable gate array; and
   an application specific integrated circuit.

8. The digital low pass filter of claim 1, forming part of one of:
   a mixing console and
   an audio processing system, and
   in which the target value is a gain to apply to an audio signal requested by the one of the mixing console and the audio processing system, and the output value is an actual gain to be applied to said audio signal.

9. A digital low pass filter for producing an output value given a target value in audio processing, comprising:
   a memory that stores a previous output value, a previous intermediate value, and the target value;

a first subtracter configured to evaluate a difference between the target value and the previous output value and to produce a first output;

a first bit shifter configured to perform a right bit-shifting operation on the first output to produce an intermediate value as a second output, wherein the number of bit shifts corresponds to a scaling factor that is the inverse of an integer power of two;

a second bit shifter configured to perform a right bit-shifting operation on the previous intermediate value, wherein the number of bit shifts is the same as those performed by the first bit shifter and to produce a third output;

a second subtracter configured to evaluate a difference between the previous intermediate value and the third output and to produce a fourth output; and an adder configured to sum twice the second output, the fourth output, and the previous output value to produce the output value;

wherein the output value is written to said memory as a new previous output value, and the intermediate value is written to said memory as a new previous intermediate value.

10. The digital low pass filter of claim 9,
forming part of one of:
a mixing console and
an audio processing system, and
in which the target value is a gain to apply to an audio signal requested by the one of the mixing console and the audio processing system, and the output value is an actual gain to be applied to said audio signal.

11. A method of performing digital low pass filtering of a target value to give an output value in audio processing, comprising the steps of:
(i) receiving a scaling factor, a previous output value, a previous intermediate value, and the target value;
(ii) evaluating a difference between the target value and the previous output value;
(iii) multiplying said difference by the scaling factor to produce an intermediate value;
(iv) subtracting unity from the scaling factor to produce an output;
(v) multiplying the previous intermediate value by the output of step (iv);
(vi) evaluating the output value by summing the previous output value, twice the intermediate value, and the output of step (v); and
(vii) storing the output value as a new previous output value, and the intermediate value as a new previous intermediate value.

12. The method of claim 11, in which the scaling factor is a number greater than zero and less than or equal to 0.1.

13. The method of claim 11, in which the scaling factor is variable so as to alter the filter response.

14. The method of claim 11, in which steps (ii) and (iv) are carried out in parallel, and steps (iii) and (v) are carried out in parallel.

15. The method of claim 11, in which:
the scaling factor, the previous output value and the previous intermediate value are pipelined whilst steps (ii) and (iv) are carried out; and
the previous output value is pipelined whilst steps (iii) and (v) are carried out.

16. The method of claim 11, in which the target value is a gain level for an audio signal requested by one of a mixing console and an audio processing system, and the output value is the gain to be applied to said audio signal.

17. A method of performing digital low pass filtering of a target value to give an output value in audio processing, comprising the steps of:
(i) receiving a scaling factor that is the inverse of an integer power of two, a previous output value, a previous intermediate value, and the target value;
(ii) evaluating a difference between the target value and the previous output value;
(iii) performing a right bit-shifting operation on said difference to produce an intermediate value, wherein the number of bit shifts effects multiplication by the scaling factor;
(iv) performing a right bit-shifting operation on the previous intermediate value, wherein the number of bit shifts is the same as in step (iii) and producing an output;
(v) evaluating a difference between the previous intermediate value and the output of step (iv) and producing another output;
(vi) evaluating the output value by summing the previous output value, twice the intermediate value, and the output of step (v); and
(vii) storing the output value as a new previous output value, and the intermediate value as a new previous intermediate value.

18. The method of claim 17, in which the target value is a gain level for an audio signal requested by one of a mixing console and an audio processing system, and the output value is the gain to be applied to said audio signal.

* * * * *